US010187422B2

(12) United States Patent
Akcin

(10) Patent No.: US 10,187,422 B2
(45) Date of Patent: *Jan. 22, 2019

(54) MITIGATION OF COMPUTER NETWORK ATTACKS

(71) Applicant: Microsoft Technology Licensing, LLC, Redmond, WA (US)

(72) Inventor: Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,575

(22) Filed: Nov. 20, 2017

(65) Prior Publication Data

US 2018/0091549 A1 Mar. 29, 2018

Related U.S. Application Data

(63) Continuation of application No. 15/446,669, filed on Mar. 1, 2017, now Pat. No. 9,853,998, which is a continuation of application No. 14/724,749, filed on May 28, 2015, now Pat. No. 9,621,577.

(51) Int. Cl.
*H04L 29/06* (2006.01)

(52) U.S. Cl.
CPC ...... *H04L 63/1458* (2013.01); *H04L 63/0236* (2013.01); *H04L 63/10* (2013.01); *H04L 63/1408* (2013.01); *H04L 63/1416* (2013.01); *H04L 63/1441* (2013.01); *H04L 63/20* (2013.01)

(58) Field of Classification Search
CPC .................................................. H04L 63/1441

USPC ........................................................... 726/1
See application file for complete search history.

(56) References Cited

U.S. PATENT DOCUMENTS

| 7,921,462 | B2 | 4/2011 | Rooney et al. |
| 7,953,855 | B2 | 5/2011 | Jayawardena et al. |
| 7,987,493 | B1 | 7/2011 | Reams et al. |
| 8,051,481 | B2 | 11/2011 | Baldonado et al. |
| 8,160,056 | B2 | 4/2012 | Van et al. |
| 8,171,562 | B2 | 5/2012 | Feng |

(Continued)

FOREIGN PATENT DOCUMENTS

| GB | 2418563 A | 3/2006 |
| WO | 2004070535 A2 | 8/2004 |

OTHER PUBLICATIONS

Kephart, Nick, "Using BGP to Reroute Traffic during a DDoS", Published on: Feb. 20, 2014, Available at: https://blog.thousandeyes.com/using-bgp-reroute-traffic-ddos/.

*Primary Examiner* — Longbit Chai
(74) *Attorney, Agent, or Firm* — Liang IP, PLLC

(57) ABSTRACT

Various techniques for mitigating computer network attacks are disclosed herein. In one embodiment, a method includes receiving indications of denial of service attacks from multiple target computing systems and determining one or more sources from which the denial of service attacks are deemed to originate in response to the received indications of denial of service attacks from the target computing systems. The method also includes negotiating with the network aggregation point for permission to divert network traffic originated from the one or more of the determined sources and destined to the target computing systems to the gateway.

20 Claims, 9 Drawing Sheets

(56) References Cited

U.S. PATENT DOCUMENTS

| | | |
|---|---|---|
| 8,234,707 B2 | 7/2012 | Stone et al. |
| 8,856,924 B2 | 10/2014 | Holloway et al. |
| 8,869,275 B2 | 10/2014 | Zhao et al. |
| 8,949,459 B1 | 2/2015 | Scholl |
| 9,038,151 B1* | 5/2015 | Chua .................. H04L 45/02 709/223 |
| 2002/0133586 A1* | 9/2002 | Shanklin ............... H04L 43/00 709/224 |
| 2013/0263256 A1 | 10/2013 | Dickinson et al. |
| 2013/0283373 A1 | 10/2013 | Zisapel et al. |
| 2013/0291107 A1 | 10/2013 | Marck et al. |

* cited by examiner

MITIGATION OF COMPUTER NETWORK ATTACKS

CROSS-REFERENCE TO RELATED APPLICATION(S)

This application is a continuation of and claims priority to U.S. patent application Ser. No. 15/446,669, filed on Mar. 1, 2017, which is a continuation of and claims priority to U.S. patent application Ser. No. 14/724,749, filed on May 28, 2015, now U.S. Pat. No. 9,621,577, issued on Apr. 11, 2017, the disclosure of which is incorporated herein in its entirety.

BACKGROUND

In computing, a denial-of-service ("DoS") attack is an attempt to render computing devices or network resources unavailable to intended users by overloading them with a large number of service requests. For example, a DoS attack may utilize a group of computers at different locations to submit a large number of service requests to a web server in order to deplete computing, communications, storage, or other types of resources associated with the web server. As a result of a DoS attack, the web server may not timely, or at all, respond to legitimate requests for services. For many organizations, not timely responding to legitimate requests can cause significant loss in revenue or harm to customer goodwill.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Several embodiments of the disclosed technology are directed to mitigation of denial of service ("DoS"), distributed DoS (DDoS), or other suitable types of computer network attacks. In one aspect, one or more mitigation gateways can be co-located proximate to internet service provider ("ISP") gateways, internet exchange point ("IXP") gateways, and/or other suitable types of network aggregation point gateways. In operation, one or more computing systems can detect attacks on at least a portion of the computing network and communicate information regarding the attacks to the mitigation gateways. The mitigation gateways can aggregate such information from multiple computing systems to determine source IP addresses and/or other suitable characteristics of network traffic related to the detected attacks. The mitigation gateways can then negotiate with corresponding network aggregation point gateways to divert at least a portion of the network traffic with the determined characteristics to the mitigation gateways. Upon receiving the diverted network traffic, the mitigation gateways can block, filter, reroute, and/or apply other suitable mitigation techniques to the diverted network traffic.

In another aspect, the mitigation gateways can also be configured to monitor for abnormal network traffic through corresponding network aggregation point gateways based on a set of traffic rules. The traffic rules can be based on machine learning of normal traffic patterns, configuration input from one or more computing networks, and/or other suitable sources. In response to detecting abnormal network traffic, the mitigation gateways can contact one or more computing systems that are the destinations for the detected abnormal network traffic. Upon confirmation from the computing systems that the detected abnormal network traffic is likely malicious, the mitigation gateways can negotiate with the corresponding network aggregation point gateways to divert at least some of the network traffic destined to the computing systems. The mitigation gateways can then apply various mitigation techniques to the diverted network traffic to mitigate or even prevent DoS, DDoS, or other suitable types of attacks on the computing systems.

In another aspect, a mitigation gateway can be configured to negotiate with other systems. For example, a mitigation gateway can receive a traffic control request that includes source, destination, and control commands (e.g., allow, deny commands). The mitigation gateway can negotiate for the ability to implement the commands by requesting permission to a control system. The control system may deny the request, allow some of the request, or allow all of the request to be implemented. The control system may respond with permissions. The control system may be owned and implemented by an ISP, be part of an IXP, be owned by another entity than the owner of the mitigation gateway, or be owned by the same entity. Regardless, the mitigation gateway has the ability to negotiate with systems across organizational boundaries for mitigation strategies.

A mitigation gateway with an ability to dynamically negotiate for traffic routing with other entities has various technical advantages. If a mitigation gateway does not negotiate for permission to route traffic, an ISP may not allow the mitigation gateway to be installed at all. Without a mitigation gateway in place, the security and performance of the network protected by the mitigation gateway is compromised. By negotiating with an ISP, or other host location network, the mitigation gateway can enhance security of the host location network by controlling permitted changes in data traffic. Still further, the host location network may permit or deny routing actions based on the impact on performance of the mitigation strategies requested. Thus, performance and efficiency of the host location network and/or the computing systems (e.g., datacenters) being protected by a mitigation gateway can be improved.

DETAILED DESCRIPTION

Certain embodiments of systems, devices, components, modules, routines, and processes for mitigating computer network attacks are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-9.

As used herein, the term "computer network attack" or "attack" generally refers to operations to disrupt, deny, degrade, or destroy information in, data streams to/from, or services provided by computers, computing systems, or computer networks. Example computer network attacks can include denial of service ("DoS"), distributed DoS ("DDoS"), data modification, identity spoofing, sniffer, or application-layer attacks. A DoS or DDoS attack is an attempt to render computers, computing systems, or computer network resources unavailable to intended users via overloading with service requests or other types of requests. Even though embodiments of the disclosed technology are described as being configured to mitigation DoS or DDoS attacks, aspects of the disclosed technology may also be applied to mitigate other suitable types of computer network attacks.

Also used herein, the term "aggregation point" generally refers to a gateway, router, switch, or other suitable types of network component in a computer network that is configured to combine network traffic from multiple sources. In one example, an aggregation point can be an Internet service provider ("ISP") gateway configured to combine network connections from multiple subscribers or users. In another example, an aggregation point can also include an Internet exchange point ("IXP") gateway through which ISPs, content delivery networks ("CDNs"), or other suitable types of computer networks (referred to as autonomous systems) exchange Internet traffic with one another.

The term "network traffic" generally refers to data streams flowing through network connections of a computer network via, for example, one or more of ISP, CDN, or IXP gateways. Network traffic can include data streams representing service requests, media data, user data, or other suitable types of data. For example, network traffic can include multiple service requests to a web server for content. Network traffic can be organized as packets, bit streams, or other suitable units. Network connections are logical and/or physical channels configured to carry network traffic.

Figure 1:
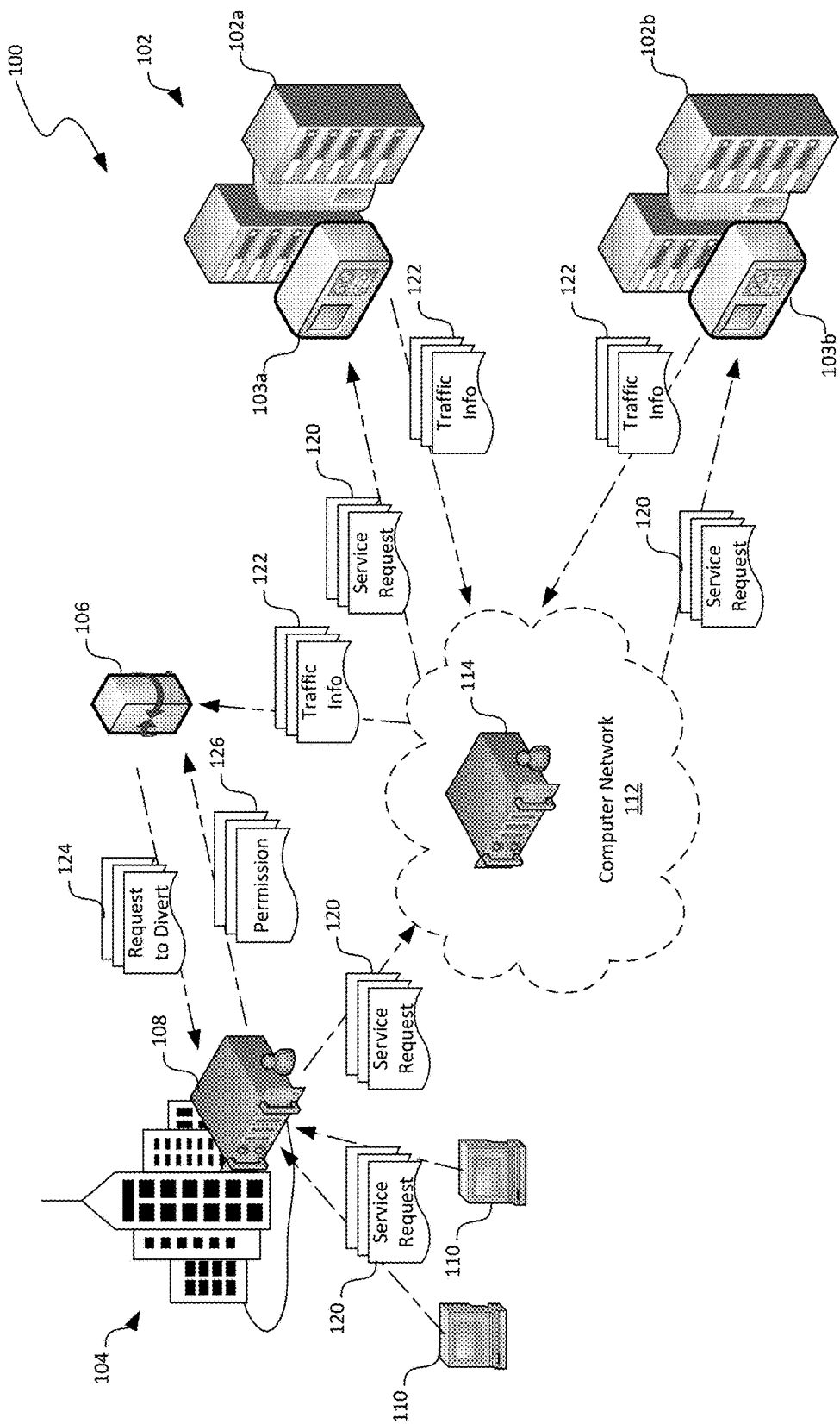
FIGS. 1-4 are schematic diagrams illustrating computing frameworks having a mitigation gateway configured to mitigate computer network attacks in accordance with embodiments of the disclosed technology.

FIG. 1 is a schematic diagram illustrating a computing framework 100 having a mitigation gateway configured to mitigate computer network attacks in accordance with embodiments of the disclosed technology. As shown in FIG. 1, the computing framework 100 can include multiple computing systems 102 (illustrated as first and second computing systems 102a and 102b, respectively), a remote network 104 interconnected by a computer network 112. Even though particular components are shown in FIG. 1 and other figures herein, in other embodiments, the computing framework 100 can also include additional and/or different networks, systems, or components.

The computer network 112 can include the Internet, a local area network, a metropolitan area network, a wide area network, and/or other suitable types of network. As shown in FIG. 1, the computer network 112 can include a network aggregation point 114 configured to exchange network traffic between the computing systems 102 and the remote network 104. In one example, the network aggregation point 114 can include an IXP gateway. In other examples, the network aggregation point 114 can also include a router, a switch, or other suitable network components.

The computing systems 102 can include any suitable types of networked computing systems. For example, in one embodiment, the first computing system 102a can include an enterprise computing system associated with a corporation. The second computing system 102b can include a datacenter provided by the corporation. In other embodiments, the computing systems 102 can each include a web service system, a media content delivery system, an online gaming system, or other suitable types of systems.

As shown in FIG. 1, each of the computing systems 102 can include a detection device 103 (identified as first and second detection device 103a and 103b, respectively). The detection devices 103 can include any suitable hardware and/or software components configured to detect DoS, DDoS, or other suitable types of computer network attacks on the corresponding computing systems 102. The detection devices 103 can also be configured to provide traffic information 122 to a mitigation gateway 106 associated with a local aggregation point 108 of the remote network 104. In certain embodiments, the provided traffic information 122 can include an indication that the computing systems 102 are under attack. In other embodiments, the provided traffic information 122 can also include information regarding sources of the detected attacks, such as, for instance, IP addresses of sources associated with the detected attacks. In further embodiments, the provided traffic information 122 can include a combination of the foregoing and/or other suitable types of data.

The remote network 104 can include a local aggregation point 108 configured to aggregate network traffic from multiple client devices 110. The client devices 110 can each include a desktop, a laptop, a tablet, a smartphone, and/or other suitable types of computing device. Though only two client devices 110 are shown in FIG. 1, in other embodiments, the remote network 104 can include any suitable number of client devices 110. In one embodiment, the local aggregation point 108 can include a local ISP gateway. In other embodiments, the local aggregation point 108 can also include enterprise network servers, private network exchanges, or other suitable components.

In certain embodiments, the remote network 104 can be associated with a particular geographic location distant from locations of the computing systems 102. For example, the remote network 104 can physically reside in, for instance, China, Russia, or Ukraine, while the computing systems 102 are located in the United States. In other embodiments, the remote network 104 can be associated with service providers (e.g., Amazon Web Service) that are physically located in the same geographic area as the computing systems 102 but in distinct autonomous systems.

As shown in FIG. 1, the remote network 104 includes a mitigation gateway 106 associated with the local aggregation point 108. In one embodiment, the mitigation gateway 106 can include a network server having a processor configured to execute suitable software components adapted to mitigate computer network attacks on the computing systems 102, as described in more detail below with reference to FIG. 5. In other embodiments, the mitigation gateway 106 can include a virtual machine configured to execute the software components. In further embodiments, the mitigation gateway 106 can also include programmable routers, switches, and/or other suitable network components.

In certain embodiments, the mitigation gateway 106 can be physically co-located with the local aggregation point 108. In other embodiments, the mitigation gateway 106 can be located in a different physical location as the remote network 104 but operatively coupled to the local aggregation point 108 via the computer network 112. In further embodiments, the mitigation gateway 106 can be located and operatively coupled to the network aggregation point 114 instead of the local aggregation point 108, as described in more detail below with reference to FIGS. 3 and 4.

In operation, the local aggregation point 108 can receive network traffic from the client devices 110. In FIGS. 1-4, service requests 120 are shown as examples of network traffic. In other embodiments, the network traffic can also include other suitable types of data streams. The local aggregation point 108 can then forward the received service requests 120 to the computing systems 102 via, for example, the network aggregation point 114 of the computer network 112. The detection devices 103a and 103b at the computing systems 102 can detect that one or more of the received service requests 120 is part of a DoS attack on the computing systems 102. The detection devices 103a and 103b can then transmit the traffic information 122 to the mitigation gateway 106. The traffic information 122 can include an indication of the attack as well as information regarding sources of the attack.

In response to receiving the traffic information 122, the mitigation gateway 106 can aggregate the received traffic information 122 from the detection devices 103a and 103b. In one example, the mitigation gateway 106 can determine if one or more of the IP addresses (or other suitable device identification) reported in the traffic information 122 are associated with the client devices 110 in the remote network 104. If the determination is positive, the mitigation gateway 106 can compile a list of all IP addresses of the client devices 110 involved in the detected attacks on the computing systems 102a and 102b. In another example, the mitigation gateway 106 can also interrogate the local aggregation point 108 to identify the client devices 110 based on, for instance, MAC addresses, local IP addresses, or other suitable signatures of network traffic involved in the detected attacks. As such, the mitigation gateway 106 can determine IP addresses (or other suitable device identification) of the client devices 110 from which the detected attacks were launched based on the aggregated traffic information 122.

The mitigation gateway 106 can then negotiate with the local aggregation point 108 to divert at least a portion of the network traffic originating from the client device 110 and destined to the computing systems 102 to the mitigation gateway 106. In the illustrated embodiment, the mitigation gateway 106 can transmit a request for permission to divert 124 to the local aggregation point 108 following, for instance, the Agent Communication Language ("ACL") or other suitable types of communications protocols. In response, the local aggregation point 108 can transmit a permission message 126 to the mitigation gateway 106. The local aggregation point 108 can allow diversion of all, a portion of, or none of the requested network traffic to the mitigation gateway 106.

In response to receiving the permission message 126 allowing diversion of at least a portion of the requested network traffic, in certain embodiments, the mitigation gateway 106 can announce to the local aggregation point 108 one or more preferred Border Gateway Protocol ("BGP") routes. In response, the local aggregation point 108 can modify routing tables to forward at least a portion of the network traffic to the mitigation gateway 106. In other embodiments, the mitigation gateway 106 can achieve diversion of the requested network traffic in other suitable manners.

In further embodiments, in addition to or in lieu of the diversion technique described above, the mitigation gateway 106 can also signal one or more of the client devices 110 to refrain from transmitting any additional service requests 120 or other types of network traffic to the computing systems 102. For example, the mitigation gateway 106 can transmit a command, a request, or other suitable types of message to the individual client devices 110. The messages can indicate that, for instance, the client devices 110 have been identified as sources of the detected attack and/or no more network traffic to the computing systems 102 to be generated. In response to receiving the messages, an application (e.g., an anti-virus or anti-spam application), a portion of an operating system (e.g., a utility), and/or other suitable components of the individual client devices 110 can reduce or stop sending service request 120 or other types of network traffic to the computing systems 102. In yet further embodiments, the mitigation gateway 106 can also signal one or more routers, switches, and/or other suitable network components in the remote network 104 to refrain from generating additional network traffic to the computing systems 102.

Figure 2:
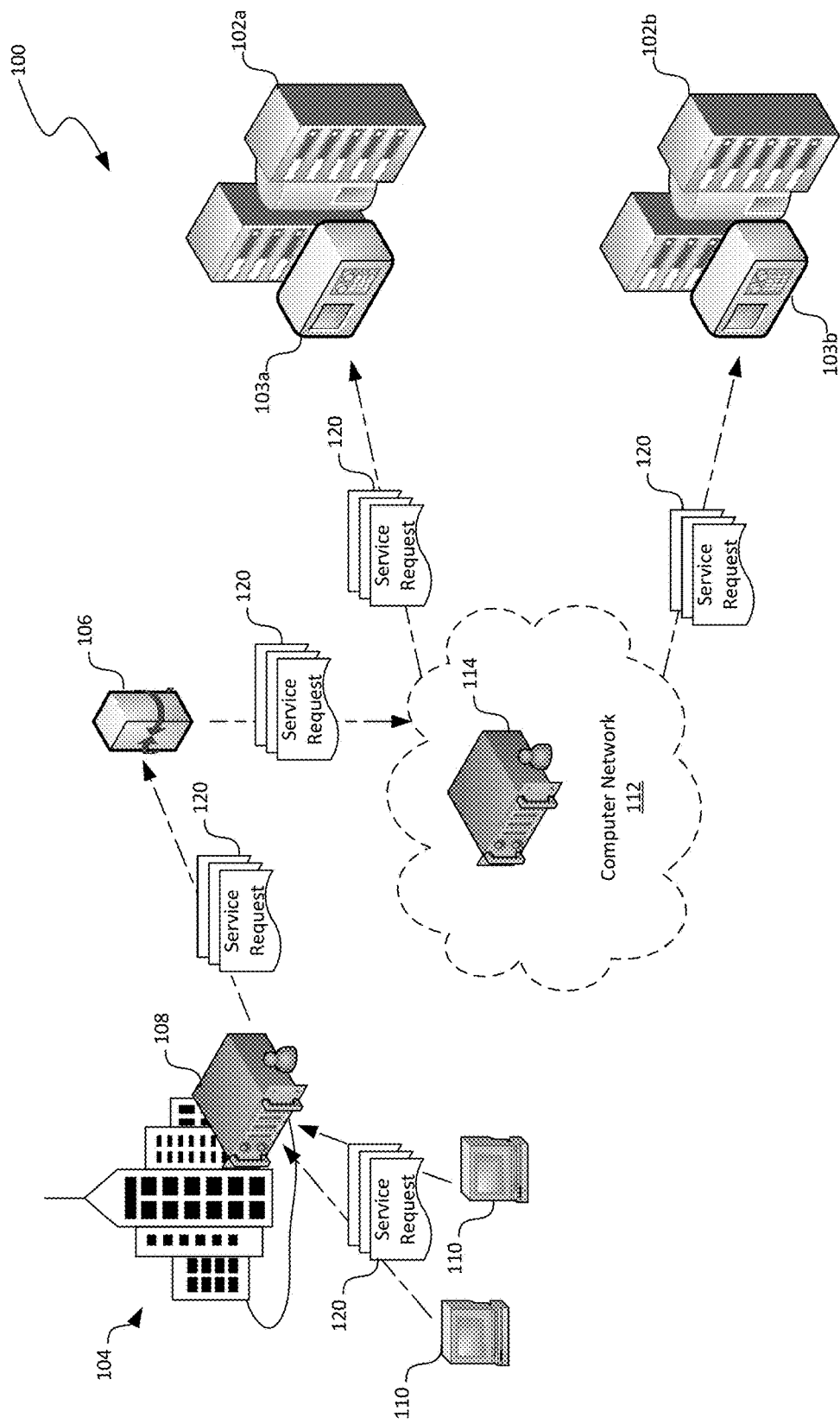

As shown in FIG. 2, the local aggregation point 108 can then forward at least a portion of the requested network traffic to the mitigation gateway 106 which in turn can apply suitable mitigation techniques to the diverted network traffic. For example, the mitigation gateway 106 can block or filter the received service requests 120. In another example, the mitigation gateway 106 can also reroute some or all of the received service requests via a different network route (not shown) to the computing systems 102. In further examples, the mitigation gateway 106 can modify the service requests 120 and/or apply other suitable mitigation techniques on the received network traffic.

Figure 5:
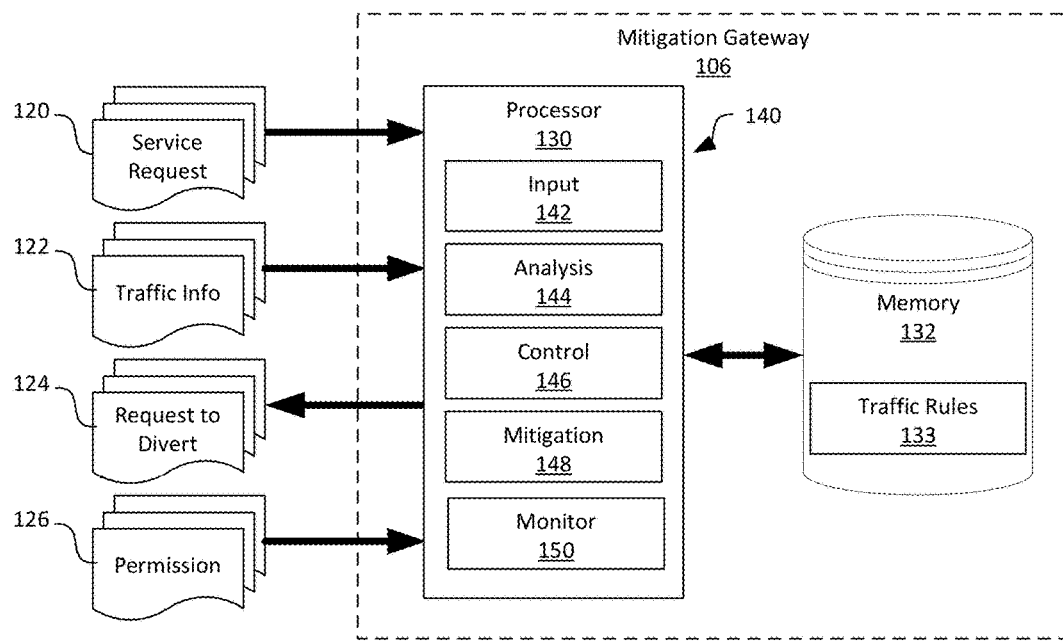
FIG. 5 is a block diagram showing software components suitable for the mitigation gateway of FIGS. 1-4 and in accordance with embodiments of the disclosed technology.

In certain embodiments, the mitigation gateway 106 can also monitor network traffic through the local aggregation point 108 for abnormal traffic patterns based on a set of traffic rules 133 (shown in FIG. 5). In certain embodiments, the mitigation gateway 106 can monitor the network traffic by, for example, mirroring certain ports of the local aggregation point 108. In other embodiments, the mitigation gateway 106 can also utilize sniffers and/or other suitable components for monitoring the network traffic.

In certain embodiments, at least some of the traffic rules can be provided based on user input at the computing systems 102. For example, administrators of the computing systems 102 can create a white list containing sources allowed to submit service requests 120 to the computing systems 102. In another example, a black list can also be created to contain, for example, IP addresses from which service requests 120 are not allowed. In a further example, the users or administrators of the computing systems 102 can also designate sources (e.g., tenants of Amazon Web Service) from which service requests 120 are not expected. An example user interface for receiving one or more traffic rules is described in more detail below with reference to FIG. 6.

In other embodiments, the mitigation gateway 106 (or other suitable components) can generate the traffic rules based on machine learning of normal traffic patterns associated with the local aggregation point 108. For example, in one embodiment, the mitigation gateway 106 can monitor and record a volume, a volume change, a temporal pattern of volume or volume change, a destination pattern, and/or other suitable characteristics of network traffic associated with one or more of the client devices 110 or destined for the individual computing systems 102. The mitigation gateway 106 can then apply various statistical analysis techniques to the recorded information. For instance, the mitigation gateway 106 can calculate an average, a standard deviation, or other suitable values based on the recorded data. In further embodiments, the traffic rules can also be provided by other suitable entities.

The mitigation gateway 106 can then compare the monitored network traffic patterns with normal traffic patterns to determine whether to raise a network traffic alarm for an abnormal traffic pattern. For instance, the mitigation gateway 106 can determine to raise an alarm under the following example conditions:

- An instantaneous or average traffic volume destined to one of the computing systems 102 exceeds a threshold value in the traffic rules by a predetermined margin (e.g., 10%, 20%, or 50%);
- An instantaneous or average traffic volume from one or more of the client devices 110 exceeds a threshold value in the traffic rules by a predetermined margin (e.g., 10%, 20%, or 50%);
- An instantaneous or average traffic volume or volume change at a particular time (e.g., midnight) destined to one of the computing systems 102 exceeds a threshold value in the traffic rules by a predetermined margin (e.g., 10%, 20%, or 50%);
- An instantaneous or average traffic volume or volume change at a particular time (e.g., midnight) from one or more of the client devices 110 exceeds a threshold value in the traffic rules by a predetermined margin (e.g., 10%, 20%, or 50%);
- A spike of traffic volume destined to one of the computing systems 102 that exceeds a threshold value in volume change in the traffic rules by a predetermined margin (e.g., 10%, 20%, or 50%); and
- A spike of traffic volume from one or more of the client devices 110 that exceeds a threshold value in volume change in the traffic rules by a predetermined margin (e.g., 10%, 20%, or 50%).

The foregoing example conditions are listed for illustration purposes only. In other embodiments, the traffic rules can include other suitable conditions associated with other suitable parameters of the network traffic.

Once the mitigation gateway 106 raises an alarm, in certain embodiments, the mitigation gateway 106 can indicate to one or more of the computing systems 102 the alarm and/or the detected abnormal traffic pattern. The mitigation gateway 106 can then receive a response from the one or more computing systems 102. If the response confirms that the detected abnormal traffic pattern is expected due to, for instance, a product release, an upgrade release, etc., the mitigation gateway 106 can mark the raised alarm as a false alarm. If the response confirms that the detected abnormal traffic pattern is not expected, the mitigation gateway 106 can then initiate the request to divert and divert at least a portion of the network traffic associated with the detected abnormal traffic pattern, as discussed above. In other embodiments, the mitigation gateway 106 can initiate the request for permission to divert upon detecting the abnormal traffic pattern without indicating to the computing systems 102 regarding the abnormal traffic pattern.

Several embodiments of the computing framework 100 can efficiently mitigate impact of DoS, DDoS, or other suitable computer network attacks. As described above, the mitigation gateway 106 can process network traffic involved in a detected attack close to the sources of the attack. As such, downstream network components (e.g., the network aggregation point 114) and the computing systems 102 may be unaffected by the detected attacks. Also, the mitigation gateway 106 can also monitor for abnormal traffic patterns of network traffic passing through the local aggregation point 108 and apply mitigation techniques when needed. As a result, response time for detecting potential computer network attacks can be shortened when compared to conventional techniques.

Figure 3:
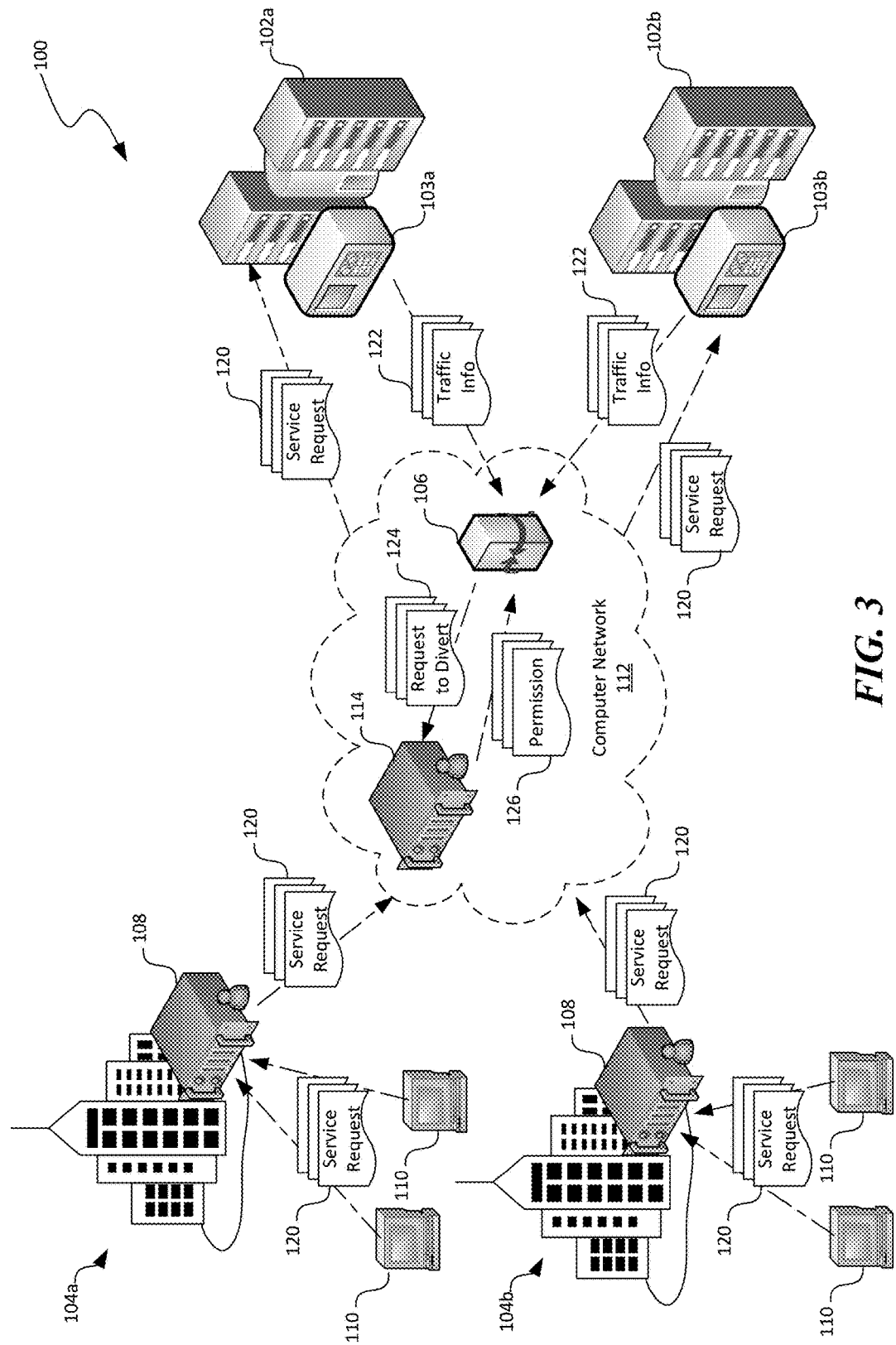
Figure 4:
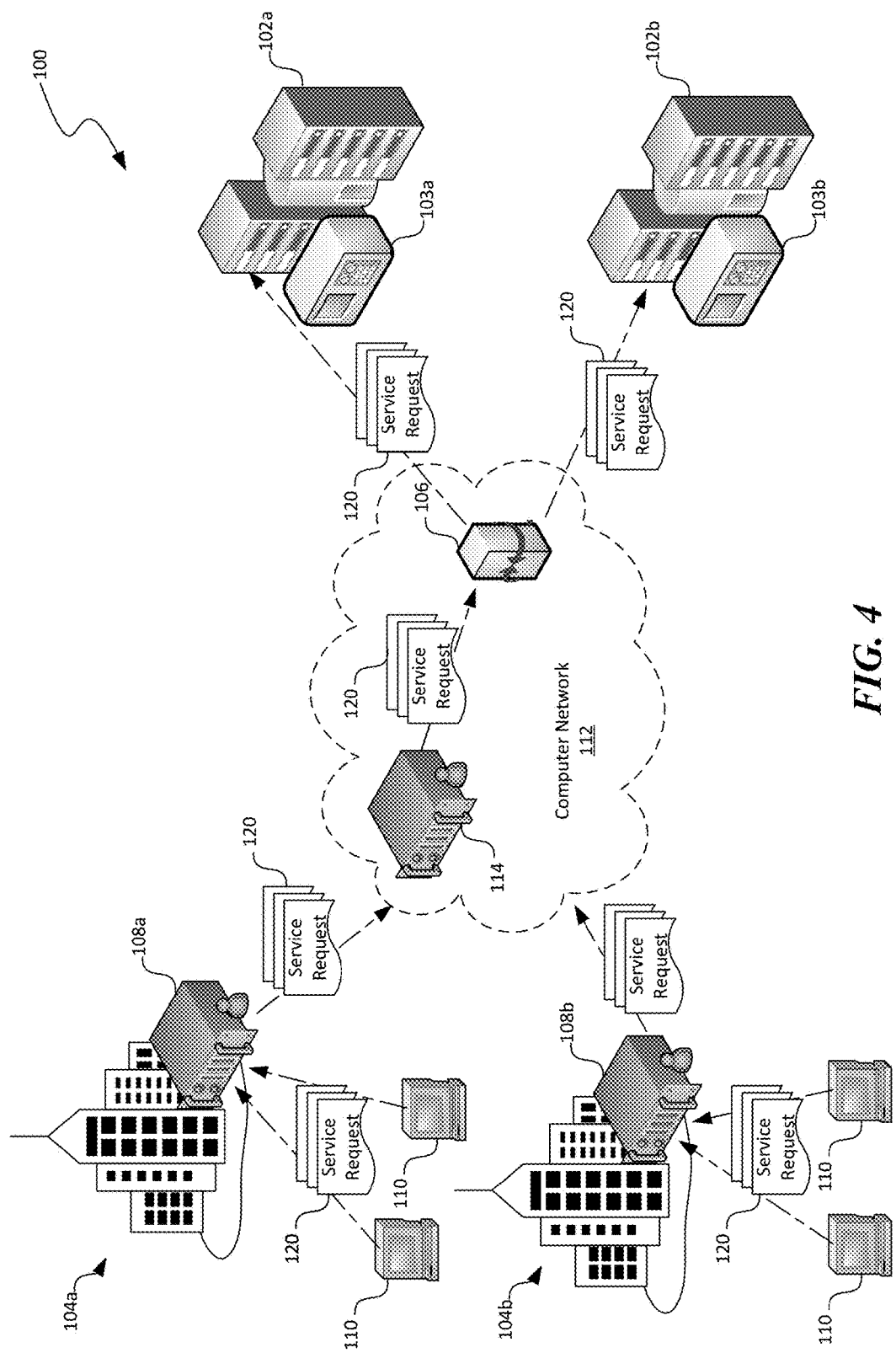

Even though the mitigation gateway 106 is shown in FIGS. 1 and 2 as being co-located and associated with the local aggregation point 108, in other embodiments, the mitigation gateway 106 can also be co-located or otherwise associated with the network aggregation point 114, as shown in FIGS. 3 and 4. As shown in FIG. 3, the computing framework 100 can include a first remote network 104*a* and a second remote network 104*b* both communicatively coupled to the network aggregation point 114. In the illustrated embodiment, the first and second remote networks 104*a* and 104*b* are generally similar to each other. For instance, both the first and second remote networks 104*a* and 104*b* include a local aggregation point 108 operatively coupled to multiple client devices 110. In other embodiments, the first and second remote networks 104*a* and 104*b* can include different components arranged in other suitable structures.

As shown in FIG. 3, the mitigation gateway 106 is co-located or otherwise associated with the network aggregation point 114. In operation, the local aggregation points 108 at both the first and second remote networks 104*a* and 104*b* can accept service requests 120 from corresponding client devices 110 and forward the service requests 120 to the network aggregation point 114. The network aggregation point 114 can then pass the received service requests 120 to the computing systems 102. Once the detection devices 103*a* and 103*b* detect a computer network attack, the detection devices 103*a* and 103*b* can transmit the traffic information 122 to the mitigation gateway 106. The mitigation gateway 106 can then negotiate with the network aggregation point 114, instead of the local aggregation points 108 to divert at least a portion of the network traffic to the mitigation gateway 106, as described above with reference to FIG. 1.

As shown in FIG. 4, the mitigation gateway 106 can then receive at least a portion of the network traffic upon granting of a permission 126 (FIG. 3) by the network aggregation point 114. The mitigation gateway 106 can then apply various mitigation techniques to the received network traffic from the network aggregation point 114, as described above with reference to FIG. 2. In further embodiments, the computing framework 100 can include multiple mitigation gateways 106 (not shown) individually co-located or otherwise associated with each of the local aggregation points 108 and/or the network aggregation point 114.

FIG. 5 is a block diagram showing software components 140 suitable for the mitigation gateway 106 of FIGS. 1-4 and in accordance with embodiments of the disclosed technology. In FIG. 5 and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 5, the mitigation gateway 106 can include a processor 130 coupled to a memory 132. The processor 130 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 130 (e.g., instructions for performing the methods discussed below with reference to FIGS. 7A-8). As shown in FIG. 5, the memory 132 can also contain data representing a set of traffic rules 133 and/or other suitable data. The traffic rules 133 can each define one or more conditions upon which an abnormal traffic pattern may be indicated, as described in more detail above with reference to FIG. 1.

The processor 130 can execute instructions to provide a plurality of software components 140 configured to facilitate mitigation of DoS, DDoS, or other suitable types of computer network attacks. As shown in FIG. 5, the software components 140 include an input component 142, an analysis component 144, a control component 146, a mitigation component 148, and a monitor component 150 operatively coupled to one another. In one embodiment, all of the software components 140 can reside on a single computing device (e.g., a network server). In other embodiments, the software components 140 can also reside on a plurality of distinct computing devices. In further embodiments, the software components 140 may also include network interface components and/or other suitable modules or components (not shown).

The input component 142 can be configured to receive traffic information 122 from multiple computing systems 102 operatively coupled to the mitigation gateway 106 via the computer network 112 (FIG. 1). As discussed above with reference to FIG. 1, the traffic information 122 can include an indication of a computer network attack as well as information regarding suspected sources of the attack. For example, the traffic information 122 from the first computing system 102a can include a list of destination IP addresses in the computing systems 102, corresponding source IP addresses, an associated autonomous system ("AS"), and an associated action (e.g., drop, block, etc.) as follows:

| Source | Destination | AS | Action |
| --- | --- | --- | --- |
| 1.1.1.1/32 | 196.100.168.1 | 125 | Drop |
| 1.2.0.0/16 | 196.100.168.2 | 125 | Drop |
| 1.2.0.0/16 | 196.100.168.8 | 125 | Drop |

The traffic information 122 from the second computing system 102b can include a list of destination IP addresses, corresponding source IP addresses, an associated autonomous system, and an associated action as follows:

| Source | Destination | AS | Action |
| --- | --- | --- | --- |
| 1.1.1.1/32 | 24.0.168.1 | 125 | Drop |
| 1.2.0.0/16 | 24.0.168.10 | 125 | Drop |
| 1.2.0.0/16 | 24.0.168.8 | 125 | Drop |

In one embodiment, the input component 142 can include a network interface module configured to receive the traffic information 122 as a network message configured according to TCP/IP or other suitable network protocols. In other embodiments, the input component 142 can also include other suitable modules. The input component 142 can then forward the received traffic information 122 to the analysis component 144.

The analysis component 144 can be configured to determine one or more sources from which the computer network attacks have originated based on the received traffic information 122 from the computing systems 102. In one embodiment, the analysis component 144 can aggregate the traffic information 122 and identify occurrences of source IP addresses from the traffic information 122. For instance, in the example above, the source IP addresses "1.2.0.0/16" can be identified as the source for transmitting multiple service requests 120 (FIG. 1) to multiple destination addresses. As a result, the source IP addresses "1.2.0.0/16" is likely associated with sources of the detected attacks. In other embodiments, the analysis component 144 can also be configured to perform sorting, filtering, pattern recognition, and/or other suitable operations to identify the sources of the detected attacks.

The control component 146 can be configured to transmit a request 124 for permission to the local aggregation point 108 (FIG. 1) and/or the network aggregation point 114 (FIG. 3) for diversion of at least a portion of network traffic to the mitigation gateway 106. The requested network traffic is originated from one or more of the determined sources and destined to the computing systems 102. For instance, in the example above, the mitigation gateway 106 can request diversion of all network traffic associated with the source IP addresses "1.2.0.0/16" and destined to the computing systems 102. The input component 142 can then receive a permission 126 from the local aggregation point 108 and/or the network aggregation point 114.

If the permission 126 indicates that at least a portion of the requested network traffic is granted, the input component 142 can then be configured to receive the service requests 120 or other suitable types of network traffic from the local aggregation point 108 and/or the network aggregation point 114. The input component 142 can then forward the received network traffic to the mitigation component 148.

The mitigation component 148 can be configured to mitigate the detected computer network attacks on the computing systems 102 by performing various mitigation techniques on the diverted network traffic. For example, in one embodiment, the mitigation component 148 can block the received network traffic from reaching the computing systems 102. In another embodiment, the mitigation component 148 can filter the received network traffic based on, for instance, the identified source IP addresses "1.2.0.0/16." Network traffic that is not originated form this IP address can then be forwarded to the computing systems 102. In yet another embodiment, the mitigation component 148 can reroute at least a portion of the received network traffic via, for instance, a new network connection than the original network connection. During such reroute, the mitigation component 148 may also apply traffic balancing techniques between the new and original network connections. In further embodiments, the mitigation component 148 can apply a combination of the foregoing and/or other suitable mitigation techniques.

The monitor component 150 can be configured to monitor network traffic through the local aggregation point 108 and/or the network aggregation point 114 for abnormal traffic patterns based on the traffic rules 133. The monitor component 150 can also be configured to indicate an alarm when an abnormal traffic pattern is detected or when a normal traffic pattern is violated. Once the monitor component 150 raises an alarm, in certain embodiments, the monitor component 150 can indicate to one or more of the computing systems 102 the alarm and/or the detected abnormal traffic pattern.

The input component 142 can then receive a response (not shown) from the one or more computing systems 102. If the response confirms that the detected abnormal traffic pattern is expected, the monitor component 150 can clear the raised alarm. If the response confirms that the detected abnormal traffic pattern is not expected, the monitor component 150 can then cause the control module 146 to initiate the request to divert at least a portion of the network traffic associated with the detected abnormal traffic pattern. The mitigation component 148 can then apply the various mitigation techniques to any received diverted network traffic, as described above.

Even though particular components 140 are shown in FIG. 5, in other embodiments, the processor 130 of the mitigation gateway 106 can include fewer, additional, and/or different components. For example, in certain embodiments, the monitor component 150 may be omitted. Instead, the mitigation gateway 106 relies upon the detection devices 103a and 103b (FIG. 1) for detection of computer network attacks. In other embodiments, the mitigation gateway 106 can also include an announcement component (not shown) configured to announce a detected computer network attack on one computing systems (e.g., the first computing system 102a) to other computing systems (e.g., the second computing system 102b). In response to such announcements, the second computing system 102b may anticipate, immunize, and/or perform other suitable countermeasures for the detected computer network attacks.

Figure 6:
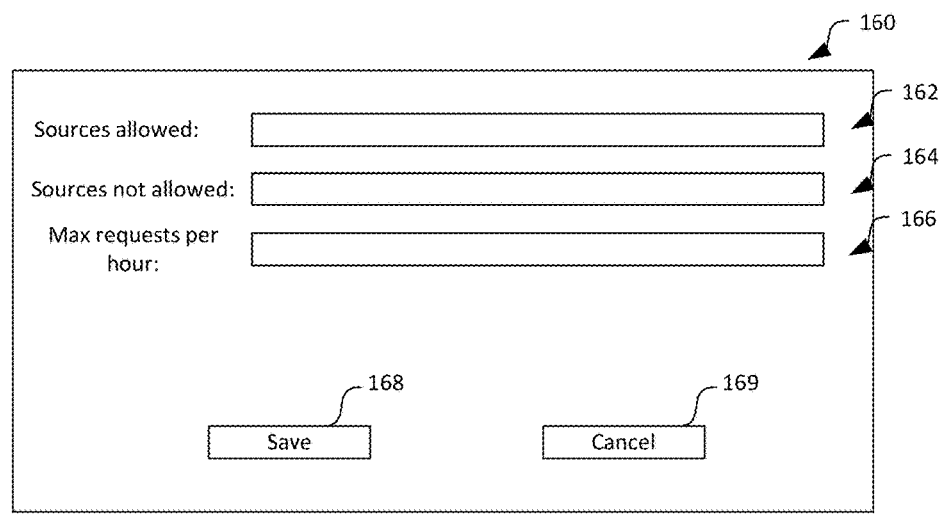
FIG. 6 is a schematic diagram showing a user interface configured to receive network traffic rules in accordance with embodiments of the disclosed technology.

FIG. 6 is a schematic diagram showing a user interface 160 configured to receive network traffic rules in accordance with embodiments of the disclosed technology. The user interface 160 can be configured to receive traffic rules from, for example, an administrator of an enterprise network, a tenant of a hosted service provided by a datacenter, an administrator of a datacenter, or other suitable entities. As shown in FIG. 6, the user interface 160 can include multiple input fields 162, 164, and 166 for receiving one or more conditions. For example, the first input field 162 is configured to receive one or more sources allowed to transmit service requests 120 (FIG. 1) or other suitable data. The second input field 164 is configured to receive one or more sources not allowed to transmit service requests 120 or other suitable data. The third input field 166 is configured to receive an input for a maximum requests per hour. The user interface 160 can also include control features such as the save button 168 and the cancel button 169. Even though particular input fields and control features are shown in FIG. 6, in other embodiments, the user interface 160 can include other suitable input fields and/or control features.

Figure 7A:
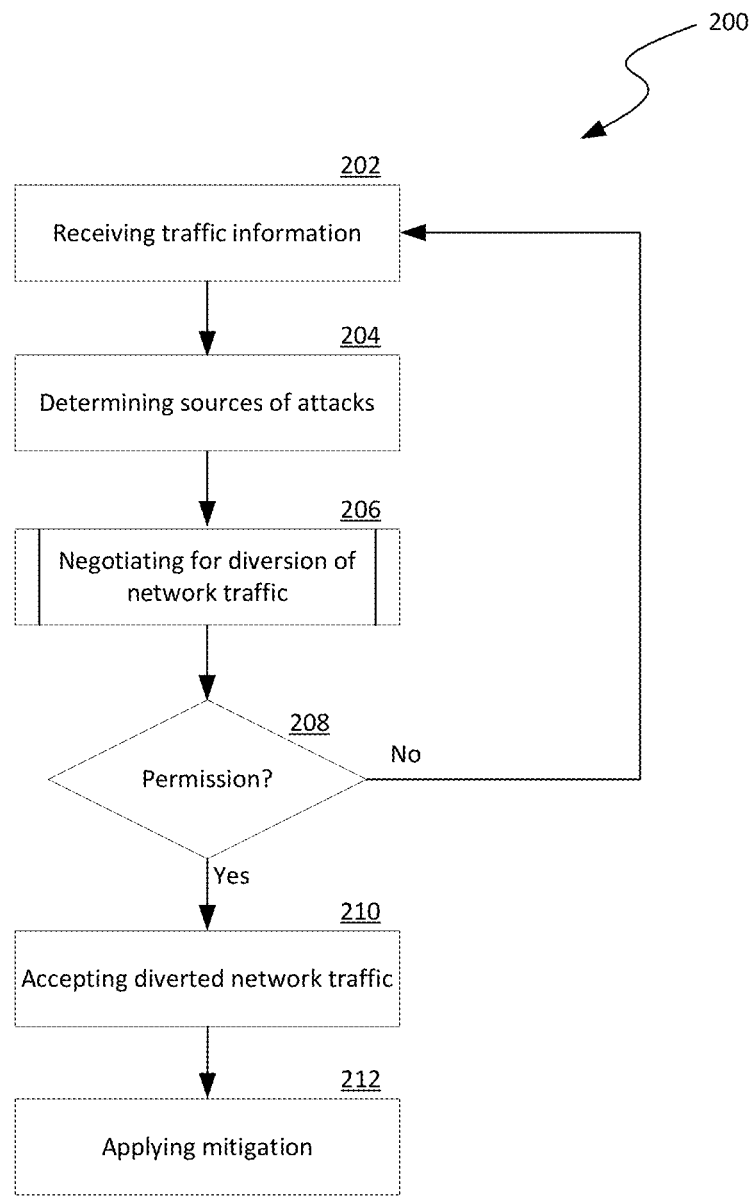
FIGS. 7A, 7B, and 8 are flow diagrams illustrating embodiments of a process of mitigating computer network attacks in accordance with embodiments of the disclosed technology.

FIG. 7A is a flow diagram illustrating embodiments of a process 200 of mitigating computer network attacks in accordance with embodiments of the disclosed technology. Even though various embodiments of the process 200 are described below with reference to the computing framework 100 of FIGS. 1-4 and the software components 140 of FIG. 5, in other embodiments, the process 200 may be performed with other suitable types of computing frameworks, systems, components, or modules.

As shown in FIG. 7A, the process 200 can include receiving traffic information at stage 202. As described above, the traffic information can include an indication of a detected attack, source information of the detected attack, and/or other suitable information. The process 200 can then include determining one or more sources of the detected attack at stage 204. Various techniques may be utilized to determine the one or more sources, such as those described above with reference to FIG. 5.

The process 200 can also include negotiating for diversion of at least a portion of the network traffic at stage 206. The network traffic requested to be diverted is originated from the identified one or more sources and destined to one or more computing systems at which the attack is detected. As described in more detail above with reference to FIG. 1, negotiating for diversion may be with the local aggregation point 108 (FIG. 1) and/or the network aggregation point 114 (FIG. 3) following any suitable network protocols. An example of negotiating for diversion of network traffic is described below in more detail with reference to FIG. 7B.

The process 200 can then include a decision stage 208 to determine if permission is granted to divert at least a portion of the requested network traffic. In response to determining that a permission is not granted by, for example, the local aggregation point 108 or the network aggregation point 114, the process 200 reverts to receiving traffic information at stage 202. In response to determining that a permission is granted to divert at least a portion of the requested network traffic, the process 200 includes causing the local aggregation point 108 or the network aggregation point 114 to divert at least a portion of the requested network traffic and accepting the diverted network traffic at stage 210. In certain embodiments, permission may be granted to divert network traffic from a subset of the determined sources. In other embodiments, permission may be granted to divert certain types (e.g., web traffic) of network traffic from a particular source. In further embodiments, the permission to divert may be granted partially in other suitable manners. The process 200 can further include applying various mitigation techniques on the diverted network traffic, as described above with reference to FIG. 5, at stage 212.

Figure 7B:
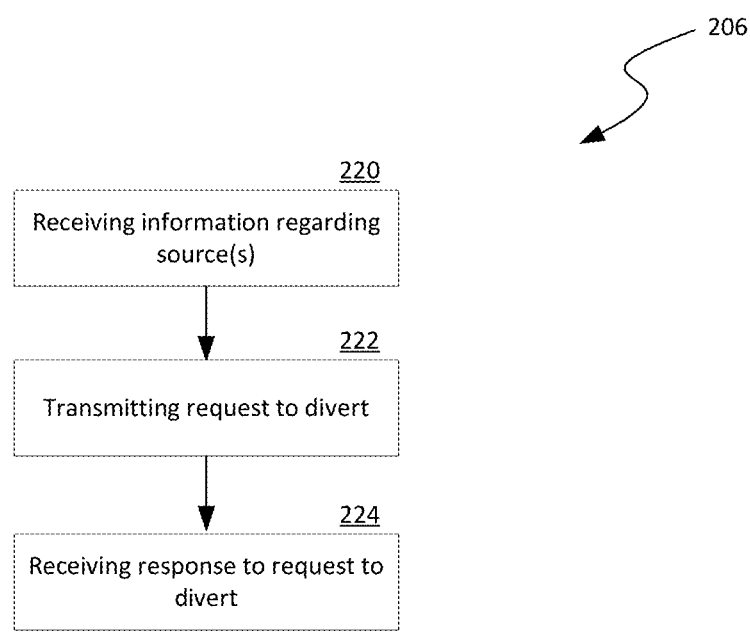

FIG. 7B is a flow diagram illustration an example process 206 of negotiating for diversion of network traffic in accordance with embodiments of the disclosed technology. As shown in FIG. 7B, the process 206 includes receiving data or information regarding the determined sources at stage 220. The process 206 can then include sending or transmitting the received data or information regarding the sources and a request to divert network traffic to, for example, the local aggregation point 108 or the network aggregation point 114 of FIGS. 1 and 2, at stage 222. The process 206 can then include receiving a response message from, for example, the local aggregation point 108 or the network aggregation point 114 in response to the transmitted request at stage 224. As described above with reference to FIG. 7A, the response message can grant, partially grant, or deny permission to the request to divert network traffic originating from the sources.

Figure 8:
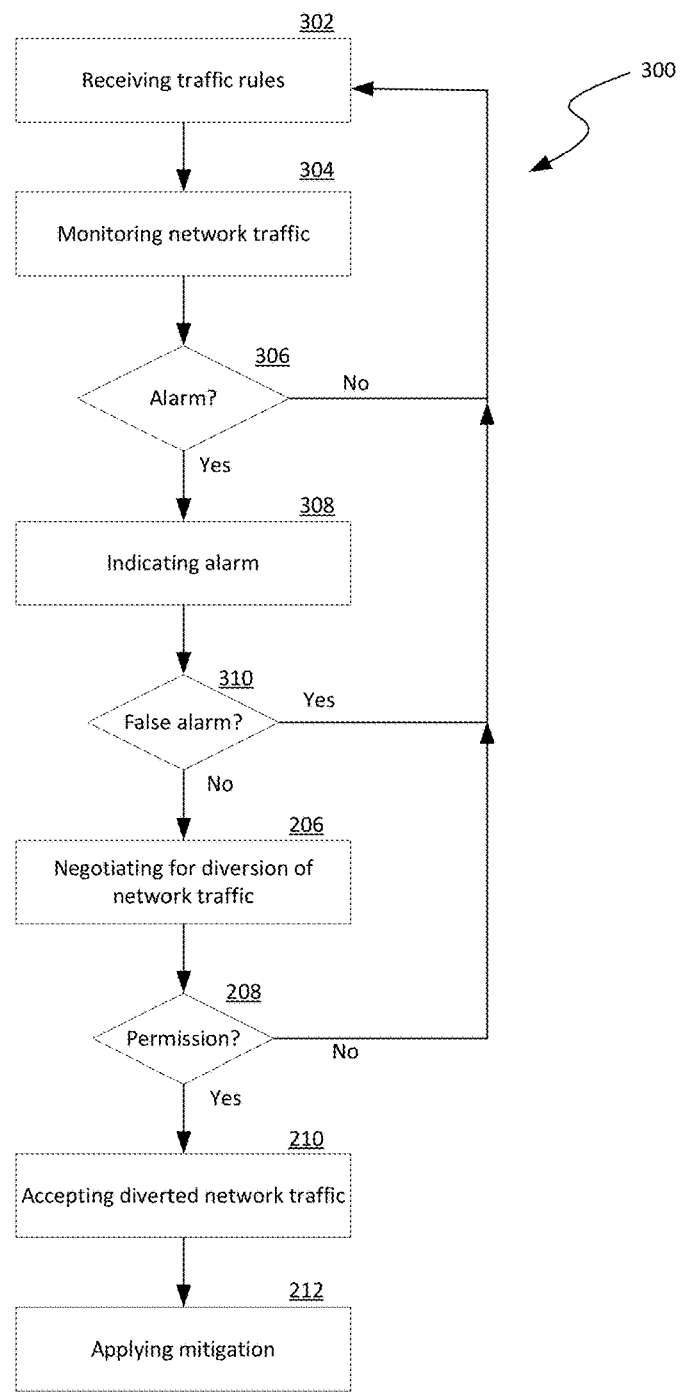

FIG. 8 is a flow diagrams illustrating embodiments of another process 300 of mitigating computer network attacks in accordance with embodiments of the disclosed technology. Certain operations in FIG. 8 are generally similar to those in FIG. 7A or 7B. As such, similar operations are identified by similar references.

As shown in FIG. 8, the process 300 can include receiving one or more traffic rules at stage 302. Each of the traffic rules can include one or more conditions upon which an abnormal traffic pattern may be identified, as described in more detail above with reference to FIG. 5. The process 300 can also include monitoring network traffic through the local aggregation point 108 (FIG. 1) and/or the network aggregation point 114 (FIG. 3) at stage 304. The process 300 can then include a decision stage 306 to determine if an abnormal traffic pattern is detected and an alarm is to be raised.

In response to determining that an alarm is not to be raised, the process 300 reverts to receiving traffic rules at stage 302. In response to determining that an alarm is to be raised, the process 300 proceeds to indicating the alarm to one or more computing systems 102 (FIG. 1) at stage 308. The process 300 can then include another decision stage 310 to determine if the raised alarm is a false alarm. The determination can be based on an input from one or more of the computing systems 102, an administrator of the mitigation gateway 106 (FIG. 1), or other suitable entities.

In response to determining that the raised alarm is a false alarm, the process 300 reverts to receiving traffic rules at stage 302. In response to determining that the raised alarm is not a false alarm, the process 300 proceeds to negotiating for diversion of network traffic at stage 206, the decision stage 208, accepting the diverted network traffic at stage 210, and applying various mitigation techniques at stage 212, as described above with reference to FIG. 7A.

Figure 9:
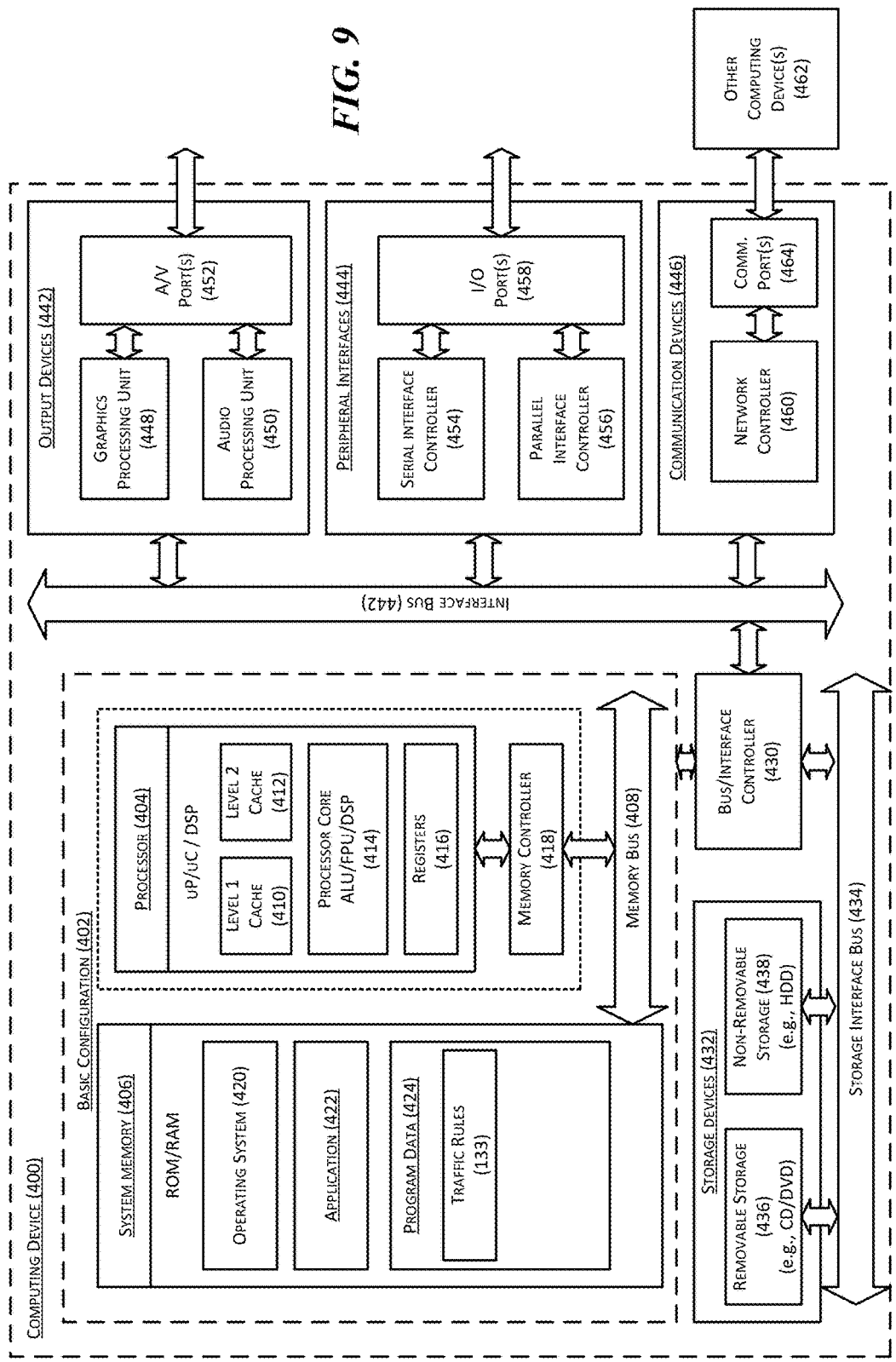
FIG. 9 is a computing device suitable for certain components of the computing frameworks in FIGS. 1-4.

FIG. 9 is a computing device 400 suitable for certain components of the computing framework 100 in FIGS. 1-4. For example, the computing device 400 may be suitable for the mitigation gateway 106 of FIGS. 1-4. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. The program data 424 may include, for example, the traffic rules 133. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A method for mitigating denial of service attacks using a mitigation gateway configured to receive and divert network traffic directed to a remote computing system in communication with the mitigation gateway via a computer network, the mitigation gateway being physically located proximate to a network aggregation point including an Internet service provider ("ISP") gateway or an Internet exchange point ("IXP") gateway, the method comprising:

receiving, at the mitigation gateway, traffic information transmitted from the remote computing system, the traffic information including data indicating that the remote computing system is under a computer network attack and data representing a source identification and an action to be performed on the network traffic associated with the computer network attack; and in response to receiving the traffic information, at the mitigation gateway, negotiating with the network aggregation point for a permission to divert additional network traffic passing through the network aggregation point to the remote computing system from the source identified by the source identification, and in response to receiving the permission from the network aggregation point, performing the action by the mitigation gateway to the diverted additional network traffic as indicated in the received traffic information transmitted from the remote computing system.

2. The method of claim 1 wherein the data representing the source identification includes an IP address of the source, and wherein receiving the diverted additional traffic includes receiving the diverted additional traffic originating from the IP address of the source.

3. The method of claim 1 wherein:
the data representing the source identification includes an IP address of the source; and
negotiating with the network aggregation point for the permission includes requesting to divert the additional network traffic originated from the identified IP address of the source.

4. The method of claim 1 wherein:
the data representing the source identification includes an IP address of the source; and
negotiating with the network aggregation point for the permission includes:
 requesting the network aggregation point to divert the additional network traffic originated from the IP address of the source; and
 receiving a permission from the network aggregation point to divert the additional network traffic originated from the IP address of the source.

5. The method of claim 1 wherein:
the data representing the source identification includes an IP address of the source; and
negotiating with the network aggregation point for the permission includes:
 requesting the network aggregation point to divert the additional network traffic originated from the IP address of the source;
 receiving a permission to divert the additional network traffic originated from the IP address of the source; and
 announcing a network route to the network aggregation point for diverting the additional network traffic from the IP address of the source to the mitigation gateway.

6. The method of claim 1, further comprising:
receiving, at the mitigation gateway, a traffic rule from the remote computing system, the traffic rule identifying an abnormal traffic pattern or an acceptable traffic pattern associated with network traffic destined to the remote computing system; and
monitoring, at the mitigation gateway, the network traffic originating from the source, passing through the network aggregation point, and destined to the remote computing system based on the received traffic rule.

7. The method of claim 1, further comprising:
receiving, at the mitigation gateway, a traffic rule from the remote computing system, the traffic rule identifying an abnormal or a normal traffic pattern of the network traffic originating from the source and destined to the remote computing system;
monitoring, at the mitigation gateway, the network traffic from the source, passing through the network aggregation point, and destined to the remote computing system based on the received traffic rule; and
indicating, to the remote computing system, a network traffic alarm when the abnormal traffic pattern is detected or when one of the normal traffic pattern is violated.

8. The method of claim 1, further comprising:
receiving, at the mitigation gateway, a traffic rule from the remote computing system, the traffic rule identifying an abnormal or a normal traffic pattern of the network traffic originating from the source and destined to the remote computing system;
monitoring, at the mitigation gateway, the network traffic from the source, passing through the network aggregation point, and destined to the remote computing system based on the received traffic rule;
indicating, to the remote computing system, a network traffic alarm when the abnormal traffic pattern is detected or when the normal traffic pattern is violated; and
receiving an indication from the remote computing system that the network traffic alarm is a false alarm.

9. The method of claim 1, further comprising:
receiving, at the mitigation gateway, a traffic rule from the remote computing system, the traffic rule identifying an abnormal or a normal traffic pattern of the network traffic originating from the source and destined to the remote computing system;

monitoring, at the mitigation gateway, the network traffic from the source, passing through the network aggregation point, and destined to the remote computing system based on the received traffic rule;
indicating, to the remote computing system, a network traffic alarm when the abnormal traffic pattern is detected or when the normal traffic pattern is violated;
receiving, from the remote computing system, an indication that the network traffic alarm is a denial of service attack; and
in response to receiving the indication, performing the negotiating and receiving operations based on the identified abnormal traffic pattern.

10. The method of claim 1, further comprising blocking the diverted additional network traffic from reaching the remote computing system via the computer network.

11. A method for mitigating computer network attacks, comprising:
determining, at a mitigation device from received traffic information, a source identification of a source from which a computer network attack on a remote computing system is originated, network traffic associated with the computer network attack passing through a network aggregation point including an Internet service provider ("ISP") gateway or an Internet exchange point ("IXP") gateway, wherein the traffic information is transmitted from the remote computing system and includes data indicating that the remote computing system is under a computer network attack and an action to be performed on the network traffic associated with the computer network attack;
in response to receiving the traffic information from the remote computing system associated with the computer network attack, transmitting to the network aggregation point, from the mitigation device, a request for permission to divert additional network traffic originating from the source of the computer network attack to the mitigation device; and
receiving from the network aggregation point, at the mitigation device, the requested permission to divert the additional network traffic, and
in response to receiving the permission from the network aggregation point, performing the action by the mitigation gateway to the diverted additional network traffic as indicated in the received traffic information transmitted from the remote computing system.

12. The method of claim 11 wherein the source information identifies an IP address of the source related to the computer network attack on the remote computing system.

13. The method of claim 11 wherein:
the source information identifies an IP address of the source related to the computer network attack on the remote computing system; and
transmitting the request includes transmitting a request to divert the additional network traffic originated from the identified IP address and destined to the computing system via the network aggregation point.

14. The method of claim 11 wherein:
the source information identifies an IP address of the source related to the computer network attack on the remote computing system;
transmitting the request includes transmitting a request to divert the additional network traffic originated from the identified IP address and destined to the remote computing system via the network aggregation point; and
receiving the permission includes receiving a permission from the network aggregation point to divert the additional network traffic originated from the identified IP address to the remote computing system via the network aggregation point.

15. The method of claim 11 wherein:
the source information identifies an IP address of the source related to the computer network attack on the remote computing system;
transmitting the request includes transmitting a request to divert the additional network traffic originated from the identified IP address and destined to the remote computing system via the network aggregation point; and
receiving the permission includes receiving a permission from the network aggregation point to divert the additional network traffic originated from the identified IP address to the remote computing system via the network aggregation point; and
the method further includes in response to receiving the permission, announcing to the network aggregation point a network route to the mitigation device for diverting the additional network traffic from the identified IP address.

16. A mitigation gateway configured to receive and divert network traffic directed to a remote computing system in communication with the mitigation gateway and a network aggregation point via a computer network, the network aggregation point including an Internet service provider ("ISP") gateway or an Internet exchange point ("IxP") gateway, wherein the mitigation gateway comprises a hardware processor and a memory containing instructions executable by the hardware processor to cause the mitigation gateway to:
receive, at the mitigation gateway, traffic information transmitted from the remote computing system, the traffic information including data indicating that the remote computing system is under a computer network attack and data representing a source identification of a source from which the detected computer network attack originates and an action to be performed on the network traffic associated with the indicated computer network attack; and
in response to receiving the traffic information at the mitigation gateway,
send, to the network aggregation point, a request for diverting additional network traffic to the mitigation gateway, the additional network traffic being originated from the source and destined to the remote computing system; and
in response to receiving the permission from the network aggregation point, performing the action by the mitigation gateway to the diverted additional network traffic as indicated in the received traffic information transmitted from the remote computing system.

17. The mitigation gateway of claim 16 wherein the memory contains additional instructions executable by the hardware processor to cause the hardware processor to:
monitor network traffic passing through the network aggregation point for an abnormal traffic pattern based on a traffic rule received from the remote computing system that includes a datacenter, the traffic rule specifying an entity from which network traffic is not expected for a tenant of the datacenter; and
indicate a network traffic alarm when network traffic from the entity and destined to the tenant of the datacenter is detected.

18. The mitigation gateway of claim 16 wherein the memory contains additional instructions executable by the hardware processor to cause the hardware processor to:

monitor network traffic passing through the network aggregation point for an abnormal traffic pattern based on a traffic rule received from the remote computing system, the traffic rule specifying an expected network traffic volume pattern to the remote computing system;

indicate, to the remote computing system, a network traffic alarm when the monitored network traffic passing through the network aggregation point violates the received traffic rule; and in response to the indicated network traffic alarm, receive, from the remote computing system, an indication that the network traffic alarm is a false alarm.

19. The mitigation gateway of claim 16 wherein the memory contains additional instructions executable by the hardware processor to cause the hardware processor to:

monitor network traffic passing through the network aggregation point for an abnormal traffic pattern based on a traffic rule received from the remote computing system, the traffic rule specifying an expected network traffic volume pattern to the remote computing system;

indicate, to the remote computing system, a network traffic alarm when the monitored network traffic passing through the network aggregation point violates the received traffic rule; and in response to the indicated network traffic alarm, receive, from the remote computing system, a confirmation that the indicated network traffic alarm is related to a DDoS attack; and in response to the receiving the confirmation, send, to the network aggregation point through which network traffic from the source passes, a request for diverting additional network traffic from the source;

receive, from the network aggregation point, a permission to divert the additional network traffic originating from the source; and in response to receiving the permission from the network aggregation point, receive the diverted additional network traffic originating from the source and block the additional network traffic from reaching the remote computing system via the computer network.

20. The mitigation gateway of claim 16 wherein the memory contains additional instructions executable by the hardware processor to cause the hardware processor to:

monitor the network traffic passing through the network aggregation point for an abnormal traffic pattern based on a traffic rule received from the remote computing system, the traffic rule specifying an expected network traffic volume pattern to the remote computing system; and in response to that the monitored network traffic passing through the network aggregation point violates the received traffic rule, send, to the network aggregation point through which network traffic from the source passes, a request for diverting additional network traffic from the source;

receive, from the network aggregation point, a permission to divert the additional network traffic originating from the source; and in response to receiving the permission from the network aggregation point, receive the diverted additional network traffic originating from the source and block the additional network traffic from reaching the remote computing system via the computer network.

* * * * *